(12) United States Patent
Øhrn et al.

(10) Patent No.: US 7,912,849 B2
(45) Date of Patent: Mar. 22, 2011

(54) METHOD FOR DETERMINING CONTEXTUAL SUMMARY INFORMATION ACROSS DOCUMENTS

(75) Inventors: Aleksander Øhrn, Blommenholm (NO); Bjørn Olstad, Stathelle (NO)

(73) Assignee: Microsoft Corporation, Redmond, WA (US)

(*) Notice: Subject to any disclaimer, the term of this patent is extended or adjusted under 35 U.S.C. 154(b) by 289 days.

(21) Appl. No.: 11/919,663

(22) PCT Filed: May 4, 2006

(86) PCT No.: PCT/NO2006/000165
§ 371 (c)(1),
(2), (4) Date: Feb. 1, 2008

(87) PCT Pub. No.: WO2006/121338
PCT Pub. Date: Nov. 16, 2006

(65) Prior Publication Data
US 2008/0270380 A1    Oct. 30, 2008

(30) Foreign Application Priority Data
May 6, 2005  (NO) .................................. 20052215

(51) Int. Cl.
    *G06F 17/00* (2006.01)
(52) U.S. Cl. .................. 707/761; 707/756; 707/602
(58) Field of Classification Search .......... 707/756, 707/761
    See application file for complete search history.

(56) References Cited

U.S. PATENT DOCUMENTS

| 6,073,130 | A | 6/2000 | Jacobson |
| 6,633,868 | B1 | 10/2003 | Min et al. |
| 6,886,010 | B2 | 4/2005 | Kostoff |
| 7,035,864 | B1 | 4/2006 | Ferrari |
| 7,062,483 | B2 | 6/2006 | Ferrari |
| 2005/0267871 | A1* | 12/2005 | Marchisio et al. ............... 707/3 |
| 2006/0152755 | A1 | 7/2006 | Curtis |
| 2006/0200464 | A1 | 9/2006 | Gideoni |

FOREIGN PATENT DOCUMENTS

| EP | 1 207 465 A2 | 5/2002 |
| JP | 2001-249943 | 9/2001 |
| JP | 2002-024144 | 1/2002 |
| WO | WO-00/51024 A1 | 8/2000 |

OTHER PUBLICATIONS

Abney et al., "Answer Extraction" proceedings of the Conference on Applied Natural Language Processing Association Computer Linguistics, Apr. 1, 2000, pp. 296-301.

(Continued)

*Primary Examiner* — Sana Al-Hashemi
(74) *Attorney, Agent, or Firm* — Merchant & Gould P.C.

(57) ABSTRACT

In a method for determining contextual summary information across documents retrieved in response to a user query applied to a collection of documents the documents matching the query are identified. A query-dependent subsection of each of the matching documents is selected. Document properties associated with the document subsection are selected and associated with localized structures within the document. Relationships between localized document properties and user queries are determined and used to compute contextual summary information, whereby localized document properties are profiled across the retrieved documents in a contextual manner. The method allows a user query to select localized structures within a matching document and is generally applicable in information retrieval and the analysis of retrieved information.

36 Claims, 25 Drawing Sheets

OTHER PUBLICATIONS

Figure 1:
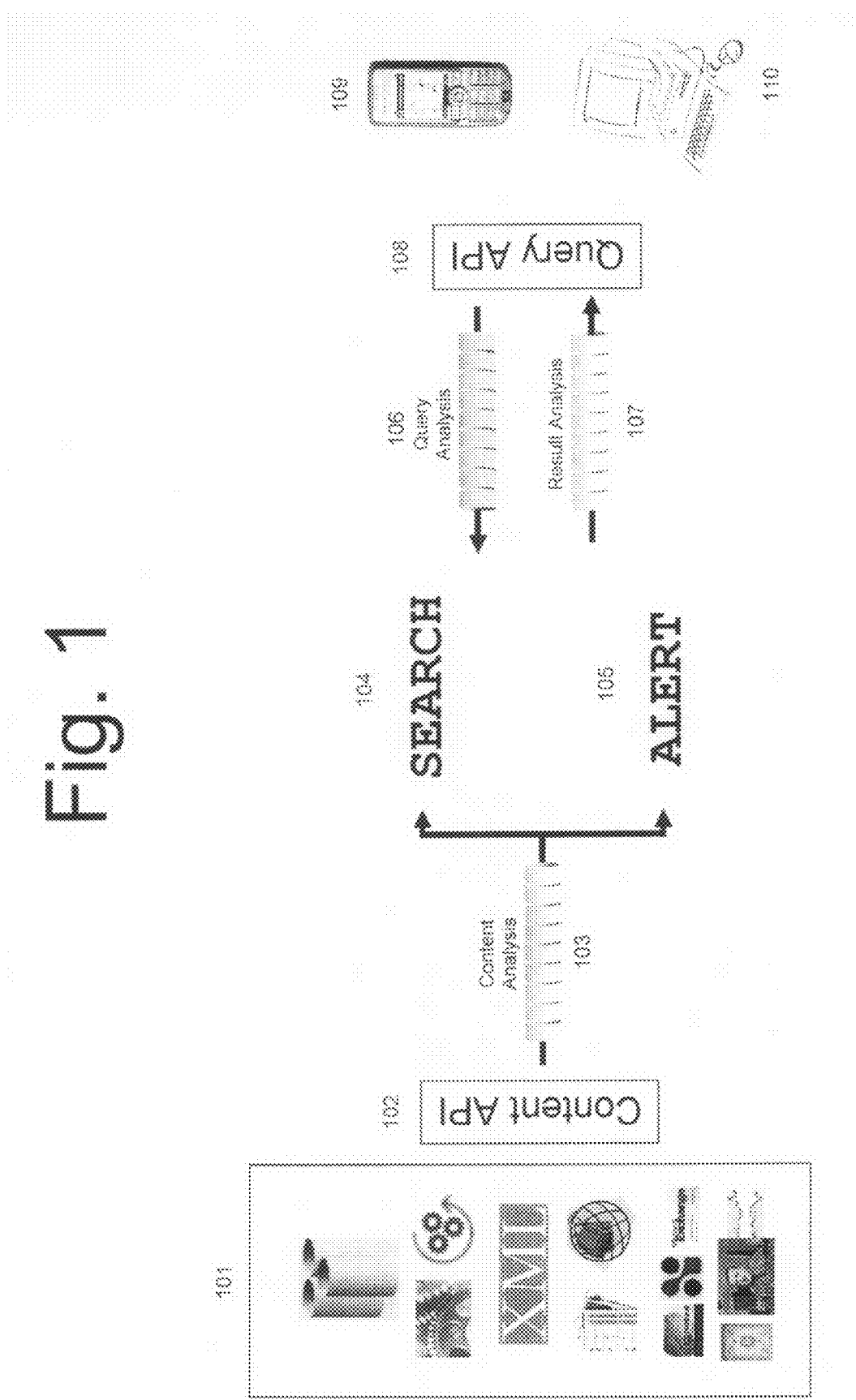

Callan et al., "Passage-Level Evidence in Document Retrieval" SIGIR '94, proceedings of the Annual International ACM-SIGIR Conference on Research and Development in Information Retrieval, Jul. 3, 1994, pp. 302-310.

European Office Action in EP 06733125.6 dated Jul. 20, 2009.

European Supplementary Search Report in EP 06733125.6 dated Mar. 26, 2009.

Hearst, M.A., "TextTiling: Segmenting Text into Multi-Paragraph Subtopic Passages" Computational Linguistics, Mar. 1, 1997, pp. 33-64.

Roberts et al., "Evaluating passage Retrieval Approaches for Question Answering" Advances in Information Retrieval lecture notes in computer Science, Mar. 2, 2004, pp. 72-84.

Salton et al., "Automatic Text Decomposition using Text Segments and Text Themes" $7^{th}$ ACM Conference on Hypertext, Mar. 16, 1996, pp. 53-65.

EP Response filed on Dec. 18, 2009 in EP 06733125.6; 20 pages.

Office Action in European Application No. 07021555.3 on Mar. 4, 2009, 5 pages.

Office Action in Japanese Application No. 2007-288256 on Jul. 9, 2010.

U.S. Non-Final Office Action in U.S. Appl. No. 11/979,607 dates Apr. 13, 2010; 17 pages.

English Translation of Office Action in Japanese Application No. 2008-509962 on Dec. 28, 2010, 7 pages.

Kinutani et al., "A Survey of Keyword-based XML Document Retrieval", Jun. 2004, 21 pages.

\* cited by examiner

Fig. 2

Structural basis for the interaction of antibiotics with the peptidyl transferase centre in eubacteria

- Category 202
  - Life science
- Concepts 203
  - Antibiotica
- Persons 204
  - Frank, Raz,...
- Universities 205
  - Max-Planck,...
- Static facts 206
  - Works_at:
    - ( Frank, Max-Planck )

Analysis & Navigation 208

{ DocID, category, concepts, Entities, Facts } 207

Fig. 6

*Nature* 413, 914 - 821 (25 October 2001); doi:10.1038/35101544

Structural basis for the interaction of antibiotics with the peptidyl transferase centre in eubacteria FRANK SCHLÜNZEN*†, RAZ ZARIVACH†‡, JÖRG HARMS*†, ANAT BASHAN‡, ANTE TOCILJ*§, RENATE ALBRECHT§, ADA YONATH*‡ & FRANÇOIS FRANCESCHI§

* Max-Planck-Research, Unit for Ribosomal Structure, Notkestrasse 85, 22603 Hamburg, Germany
‡ Department of Structural Biology, Weizmann Institute, 76100 Rehovot, Israel
§ Max-Planck-Institut für Molekulare Genetik, Ihnestrasse 73, 14195 Berlin, Germany
† These authors contributed equally to this work Correspondence and requests for materials should be addressed to F.F. (e-mail: Franceschi@molgen.mpg.de). Coordinates have been deposited in the Protein Data Bank under accession numbers 1JZX, 1JZY, 1JZZ, 1K00 and 1K01.

Ribosomes, the site of protein synthesis, are a major target for natural and synthetic antibiotics. Detailed knowledge of antibiotic binding sites is central to understanding the mechanisms of drug action. Conversely, drugs are excellent tools for studying the ribosome function. To elucidate the structural basis of ribosome–antibiotic interactions, we determined the high-resolution X-ray structures of the 50S ribosomal subunit of the eubacterium *Deinococcus radiodurans*, complexed with the clinically relevant antibiotics chloramphenicol, clindamycin and the three macrolides erythromycin, clarithromycin and roxithromycin. We found that antibiotic binding sites are composed exclusively of segments of 23S ribosomal RNA at the peptidyl transferase cavity and do not involve any interaction of the drugs with ribosomal proteins. Here we report the details of antibiotic interactions with the components of their binding sites. Our results also show the importance of putative $Mg^{+2}$ ions for the binding of some drugs. This structural analysis should facilitate rational drug design.

Fig. 7

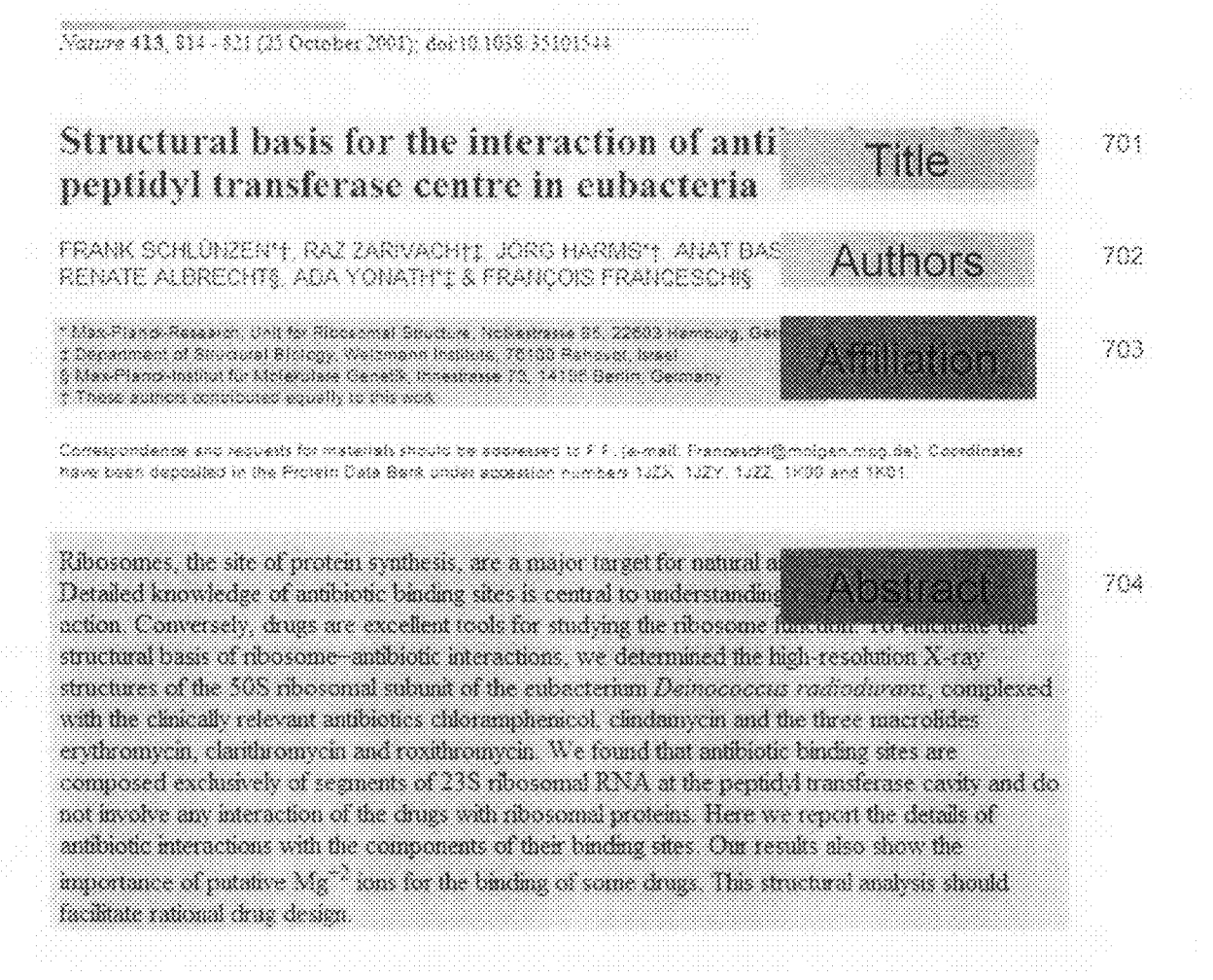

Nature 413, 814 - 821 (25 October 2001) doi:10.1038/35101544

Structural basis for the interaction of anti peptidyl transferase centre in eubacteria — Title (701)

FRANK SCHLÜNZEN, RAZ ZARIVACH, JÖRG HARMS, ANAT BAS RENATE ALBRECHT, ADA YONATH & FRANÇOIS FRANCESCHI — Authors (702)

Affiliation (703)

Abstract (704)

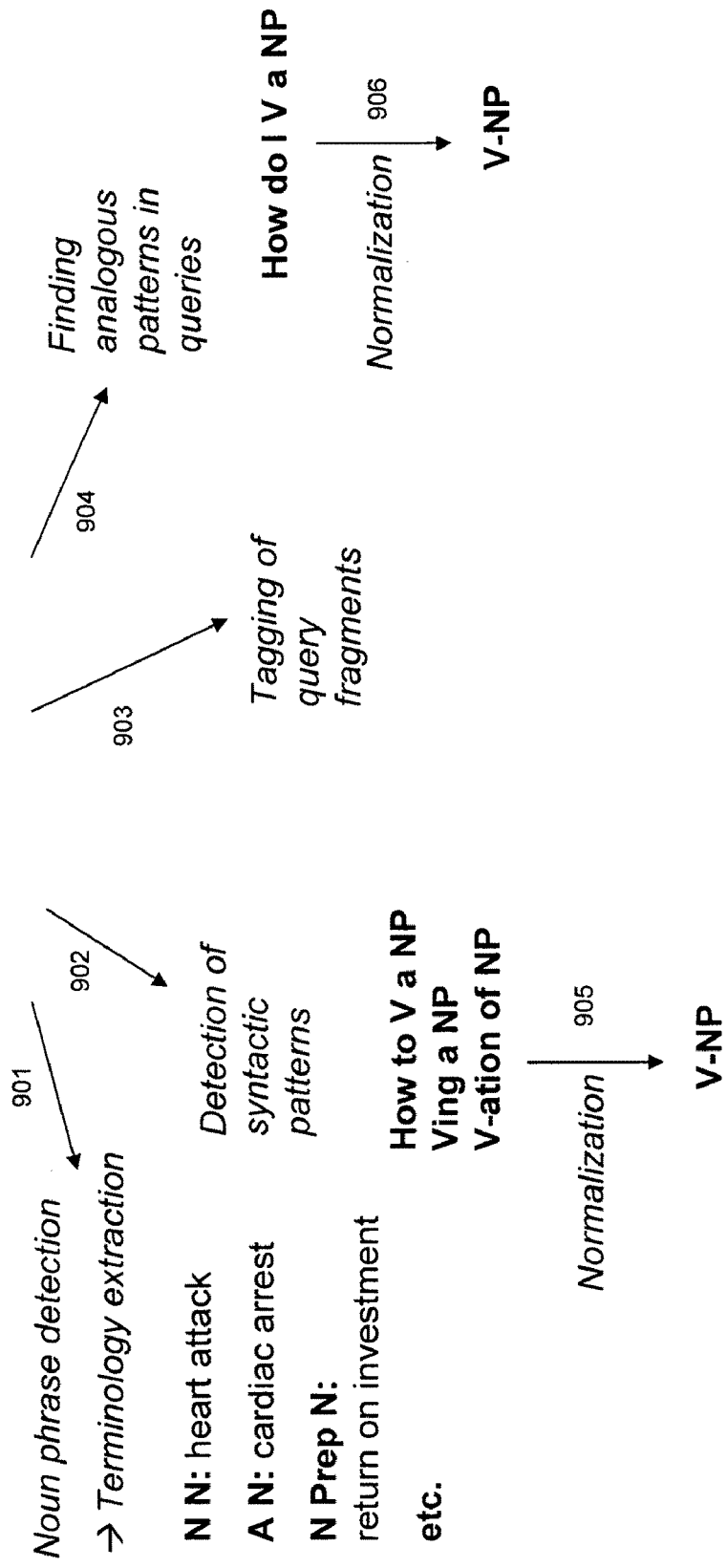

Fig. 10

Nature 413, 814 - 821 (25 October 2001); doi:10.1038/35101544

Structural basis for the interaction of antibiotics with the peptidyl transferase centre in eubacteria FRANK SCHLÜNZEN*†, RAZ ZARIVACH†‡, JÖRG HARMS*†, ANAT BASHAN‡, ANTE TOCILJ*§, RENATE ALBRECHT§, ADA YONATH*† & FRANÇOIS FRANCESCHI§

*Max-Planck-Research Unit for Ribosomal Structure, Notkestrasse 85, 22603 Hamburg, Germany
†Department of Structural Biology, Weizmann Institute, 76100 Rehovot, Israel
§Max-Planck-Institut für Molekulare Genetik, Ihnestrasse 73, 14195 Berlin, Germany
‡ These authors contributed equally to this work Correspondence and requests for materials should be addressed to F. F. (e-mail: Franceschi@molgen.mpg.de). Coordinates have been deposited in the Protein Data Bank under accession numbers 1JZX, 1JZY, 1JZZ, 1K00 and 1K01.

[Ribosomes, the site of protein synthesis, are a major target for natural and synthetic antibiotics.] [Detailed knowledge of antibiotic binding sites is central to understanding the mechanisms of drug action][Conversely, drugs are excellent tools for studying the ribosome function][To elucidate the structural basis of ribosome—antibiotic interactions, we determined the high-resolution X-ray structures of the 50S ribosomal subunit of the eubacterium Deinococcus radiodurans, complexed with the clinically relevant antibiotics chloramphenicol, clindamycin and the three macrolides erythromycin, clarithromycin and roxithromycin][We found that antibiotic binding sites are composed exclusively of segments of 23S ribosomal RNA at the peptidyl transferase cavity and do not involve any interaction of the drugs with ribosomal proteins][Here we report the details of antibiotic interactions with the components of their binding sites][Our results also show the importance of putative $Mg^{+2}$ ions for the binding of some drugs.][This structural analysis should facilitate rational drug design]

Category = Medical    1001

Authors    1002

Research institutes    1003

Science concepts    1004

Fig. 14

"When has Ukraine had elections?" — 1401

<date> — 1403   "Ukraine" — 1404   "election(s)" — 1405

Person — 1406   Location — 1407   End of sentence — 1408

Politics Of Ukraine
[[In [July 1994], [Leonid Kuchma] was elected as [Ukraine]'s second president in free and fair elections.] [[Kuchma] was reelected in [November 1999] to another five-year term, with 56 % of the vote.] [International observers criticized aspects of the election, especially slanted media coverage; however, the outcome of the vote was not called into question.] [In [March 2002], [Ukraine] held its most recent parliamentary elections, which were characterized by the Organization of Security and Cooperation in Europe ([OSCE]) as flawed but an improvement over the 1998 elections.] [The pro-presidential "For a United [Ukraine]" bloc won the largest number of seats, followed by the reformist "Our [Ukraine]" bloc of former Prime [Minister Viktor Yushchenko], and the Communist Party.] [There are 450 seats in parliament, with half chosen from party lists by proportional vote and half from individual constituencies.]]

— 1402

Date Base = 2002-03-XX — 1409

End of paragraph — 1410

Acronym Definition = Organization of Security and Cooperation in Europe — 1411

Fig. 15

```
- <PLAY>
    <MAINTITLE>The Tragedy of Antony and Cleopatra</MAINTITLE>
  + <FM>
  + <PERSONAE>
    <SCNDESCR>SCENE In several parts of the Roman empire.</SCNDESCR>
    <PLAYSUBT>ANTONY AND CLEOPATRA</PLAYSUBT>
  - <ACT>
      <TITLE>ACT I</TITLE>
    - <SCENE>
        <TITLE>SCENE I. Alexandria. A room in CLEOPATRA's palace.</TITLE>
        <STAGEDIR>Enter DEMETRIUS and PHILO</STAGEDIR>
      + <SPEECH>
      + <SPEECH>
      + <SPEECH>
      + <SPEECH>
      + <SPEECH>
        <STAGEDIR>Enter an Attendant</STAGEDIR>
      + <SPEECH>
      + <SPEECH>
      - <SPEECH>
          <SPEAKER>CLEOPATRA</SPEAKER>
          <LINE>Nay, hear them, Antony:</LINE>
          <LINE>Fulvia perchance is angry; or, who knows</LINE>
          <LINE>If the scarce-bearded Caesar have not sent</LINE>
          <LINE>His powerful mandate to you, 'Do this, or this;</LINE>
          <LINE>Take in that kingdom, and enfranchise that;</LINE>
          <LINE>Perform 't, or else we damn thee.'</LINE>
        </SPEECH>
      - <SPEECH>
          <SPEAKER>MARK ANTONY</SPEAKER>
          <LINE>How, my love!</LINE>
        </SPEECH>
      + <SPEECH>
```

Fig. 16

Fig. 18

Persons related to "Norway":

| Non-Contextual | Contextual Navigation | |
|---|---|---|
| Adolf Hitler (~4.0%) | Thor Hushovd (~6.0%) | King Haakon VII (~8.0%) |
| Roald Amundsen (~3.0%) | King Haakon VII (~6.0%) | Thor Hushovd (~6.0%) |
| Saddam Hussein (~3.0%) | King Oscar I (~4.0%) | King Oscar II (~4.0%) |
| George W. Bush (~3.0%) | Karl Knutsson Bonde (~3.0%) | Prince Carl (~3.0%) |
| King Haakon VII (~2.0%) | King Oscar II (~3.0%) | King Oscar I (~3.0%) |
| Paavo Nurmi (~2.0%) | Sondre Norheim (~2.0%) | King Haakon (~2.0%) |
| Dick Cheney (~2.0%) | Prince Haakon (~2.0%) | Prince Haakon (~2.0%) |
| Walter Payton (~2.0%) | King Harald (~2.0%) | Sondre Norheim (~2.0%) |
| King Edward III (~2.0%) | Ole Einar (~2.0%) | King Harald (~2.0%) |
| Hamid Karzai (~2.0%) | King Olav (~2.0%) | Abel (~2.0%) |
| Arnold Schwarzenegger (~2.0%) | Nikolaus von Falkenhorst (~2.0%) | Niels Henrik Abel (~2.0%) |
| Gray Davis (~2.0%) | Prince Carl (~2.0%) | Ole Einar (~2.0%) |
| Stamford Bridge (~2.0%) | King Christian III (~2.0%) | King Christian III (~2.0%) |
| King Norodom (~2.0%) | King Charles XIII (~2.0%) | King Olav (~2.0%) |
| Oliver Wendell Holmes (~2.0%) | King Charles (~2.0%) | King Charles XIV (~2.0%) |
| Prescott Bush (~2.0%) | Kjell Magne Bondevik (~2.0%) | King Charles (~2.0%) |
| George H. W. Bush (~2.0%) | King Charles XIV (~2.0%) | King Charles XIII (~2.0%) |
| Jacques Derrida (~2.0%) | Joseph François Oscar Bernadotte (~1.0%) | Kjell Magne Bondevik (~2.0%) |
| Erling Johnson (~2.0%) | Princess Eugenie (~1.0%) | Morten Harket (~1.0%) |
| Vladimir Putin (~2.0%) | King Oscar (~1.0%) | Petter Solberg (~1.0%) |
| Reinhard Heydrich (~2.0%) | Duke William (~1.0%) | Halvard Hanevold (~1.0%) |
| John Kerry (~2.0%) | Sophia Wilhelmina (~1.0%) | James Baker (~1.0%) |
| Genghis Khan (~2.0%) | Princess Sophia (~1.0%) | Knut Kloster (~1.0%) |
| Document | Paragraph | Sentence |
| 1801 | 1802 | 1803 |

Fig. 19

DYNAMIC FACTS

"...entry probe carried to [Saturn]'s moon (Titan) as part of the..."

1901   1902

Query = "Titan"   1903

Huygens probe

The *Huygens* probe, supplied by the European Space Agency (ESA) and named after the Dutch 17th century astronomer Christiaan Huygens, is an atmospheric entry probe carried to Saturn's moon Titan as part of the Cassini-Huygens mission. The combined Cassini-Huygens spacecraft was launched from Earth on October 15, 1997. Huygens separated from the Cassini orbiter on December 25, 2004, and landed on Titan on January 14, 2005 near the Xanadu Regio site. It landed on land (the possibility that it would land in an ocean was also taken into account in the design). The probe continued to send data for ca. 90 minutes after reaching the surface.

*Huygens* was designed to enter and brake in Titan's atmosphere and parachute a fully instrumented robotic laboratory down to the surface. When the mission was planned, it was not yet certain whether the landing site would be a mountain range, a flat plain, an ocean, or something else, and it was hoped that analysis of data from *Cassini* would help to answer these questions.

1904   1905   1906

Moon( Saturn, Titan )

1907

Query = "Titan"

STATIC FACTS

Fig. 23

2301 "toxic"

2302 xml:sentence:(string("toxic"))
and scope(Any_Entity))

2303 The query "toxic" is related to music artists!

2304 xml:sentence:(string("toxic"))
and scope(Artist))

2305 "toxic" related to Artist = "Britney Spears"

2306 Download Britney Spears. Toxic?
View other Britney Spears ringtones

Fig. 24

2401  Today is May 25th, 2004 and my name is not Harry Houdini or Bill Clinton.

+

2402
```
{'visibility': 93,
 'positions': PositionTable(
     {'sentence': [((0, 73), {'type': 'structural'})],
      'date': [((9, 23), {'base': '2004-05-24',
                          'type': 'semantic'})],
      'person': [((43, 56), {'type': 'semantic',
                             'meta': 'escape artist'}),
                 ((60, 72), {'type': 'semantic',
                             'meta': 'ex-president'})]})}
```

=

2403
```
<sentence type="structural">Today is <date base="2004-05-24"
type="semantic">May 25th, 2004</date> and my name is not <person
type="semantic" meta="escape artist">Harry Houdini</person> or <person
type="semantic" meta="ex-president">Bill Clinton</person>.</sentence>
```

Fig. 25

```xml
<?xml version="1.0"?>

<configuration>
<matcher type="pattern" debug="no">
    <pattern>
        <master name="foo">

<!-- Pass everything through to the transformation pipeline. -->
        <schema>^.*$</schema>
        <format>$0</format>

<!-- Simple demonstration templates. -->
        <transformation>
            <source>^\s*when\s+(is|was|does|did)\s+([^?]*).*</source>
            <target>sentence:(string("$2", mode=all) and date:*)</target>
        </transformation>

<transformation>
            <source>^\s*where\s+(is|was|does|did)\s+([^?]*).*</source>
            <target>sentence:(string("$2", mode=any) and location:*)</target>
        </transformation>

</master>
    </pattern>
</matcher>
</configuration>
```

METHOD FOR DETERMINING CONTEXTUAL SUMMARY INFORMATION ACROSS DOCUMENTS

The present invention concerns a method for determining contextual summary information across documents in a search result, and comprising steps for applying a query to a set of documents and identifying matching documents.

In particular the present invention relates to information retrieval methods and means where a user query is used to extract items or documents from a document repository. Throughout this specification the term "document" is used to denote any searchable entity and it could hence mean for instance a textual document, a database record, or a XML structure.

Prior art systems both in databases and search engine technology have been design to associate properties with the documents and compute summary information across a result set. This approach is applicable when the documents have no or limited structure. An example of this would be financial records where a query selects the transactions from a given user and the summary information is the total sum for all transactions. Another example is shopping search where a document represents a product such as mp3 players or TV screens. Price and manufacturer are typical document properties in this case and the associated summary information would typically produce price histograms for the products selected by the user query and the distribution of available manufacturers.

For more complex document structures a priori technology for summary information has substantial limitations. A large PDF document might for instance match the query request on page 5 and then talk about a specific concept on page 237. The likelihood that there is a factual relationship between the user query and the concept would in this case be very low. It is contemplated that providing the ability to compute summary information rather on a contextual or factual level inside the documents would significantly improve the quality level of extracted summary information.

The object of the present invention is to provide a general framework for computing contextual summary information across result sets and to achieve significant improvements of analytical processes, search processes, and navigation processes applied to retrieved information utilizing more factual relationships between query and document properties.

The above object as well as further features and advantages are realized according to the invention with a method which is characterized by comprising additional steps for selecting for the matching documents a query-dependent subsection of each of the documents, selecting document properties associated with the document subsection, and computing summary information for the document properties across a result set.

An advantageous embodiment of the present invention relates to a navigation system for enabling the user to effectively explore and narrow down result sets. The contextual summary information is in this case used as a basis for selecting and constructing navigation options for the end user illustrating key properties in the result set that are contextually related to the query concepts.

Another advantageous embodiment of the present invention relates to answering natural language queries. The natural language query is in this case rewritten to a structured format specifying document properties of key interest. Contextual summary information is computed across these properties and used to construct high quality and targeted results.

A further advantageous embodiment of the present invention relates to question-answering capabilities. In addition to returning documents, the query is analyzed and document properties that might contain the actual answer to the query are detected. The contextual summary information is then computed for these properties in a factually related context to the remaining query concepts. The resulting contextual summary information can be used as a based to answer both queries with unique answers and queries where a range of answer candidates.

A yet further advantageous embodiment of the present invention relates to query disambiguation where the contextual summary information is used to understand possible interpretations of the user query.

Additional features and advantages of the present invention will be apparent from the appended dependent claims.

Figure 8:
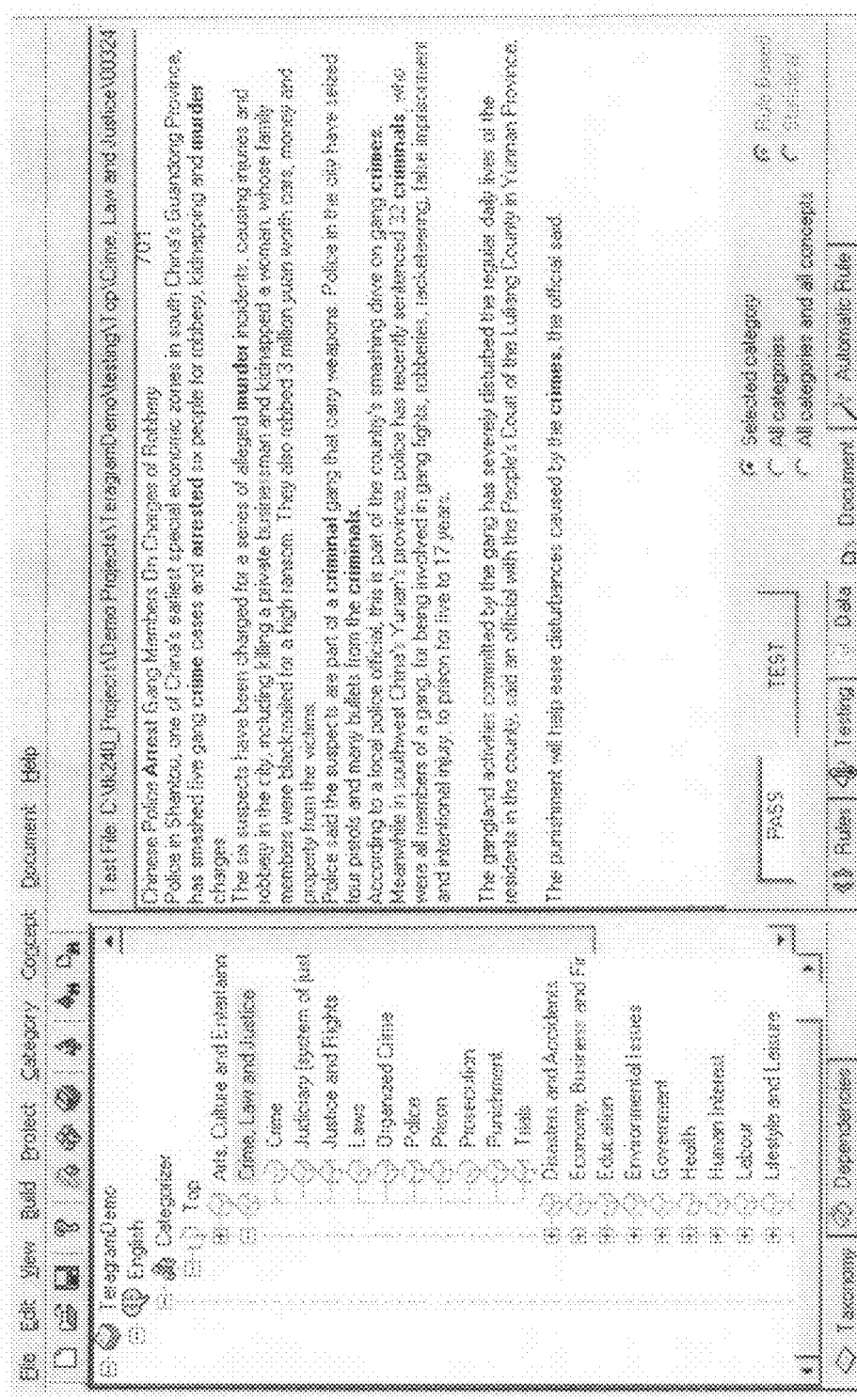
Figure 11:
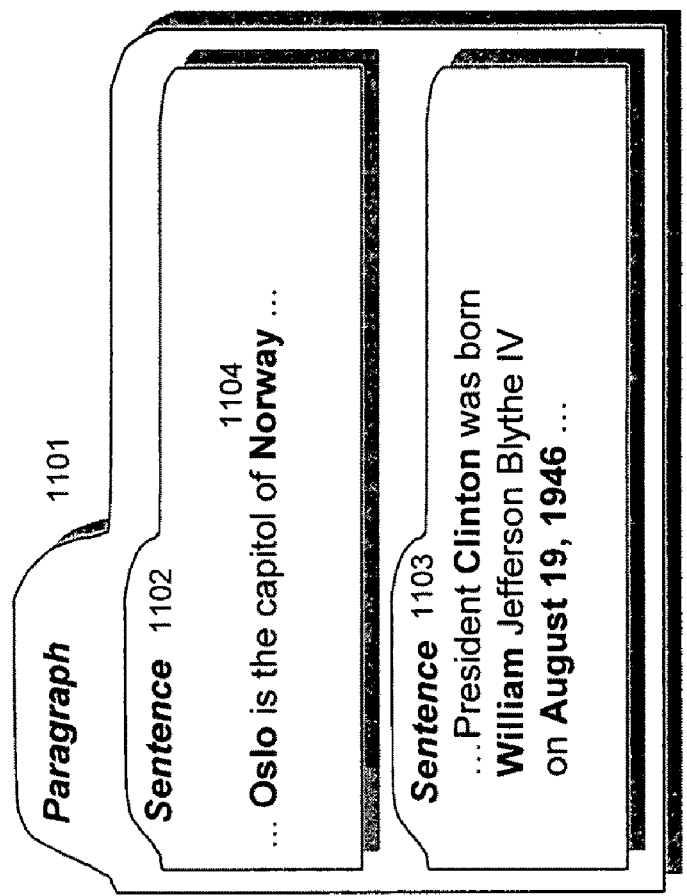
Figure 12:
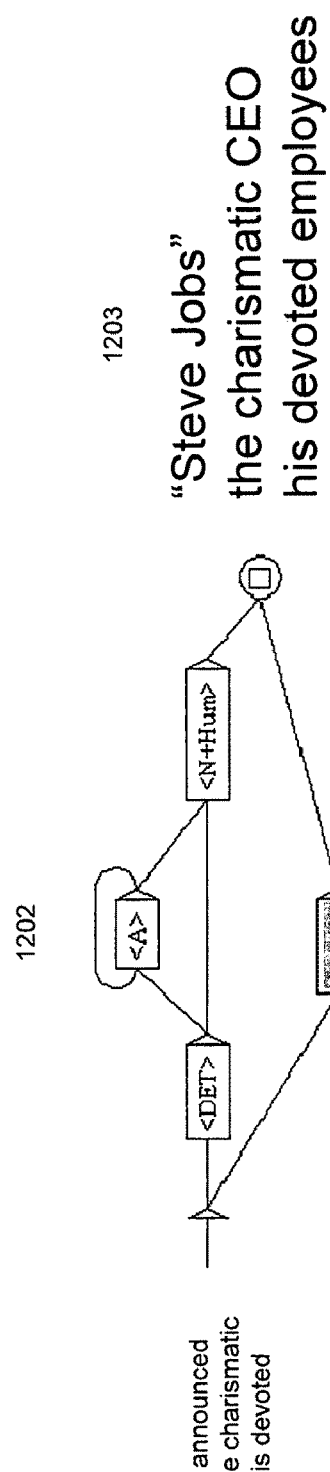
Figure 13:
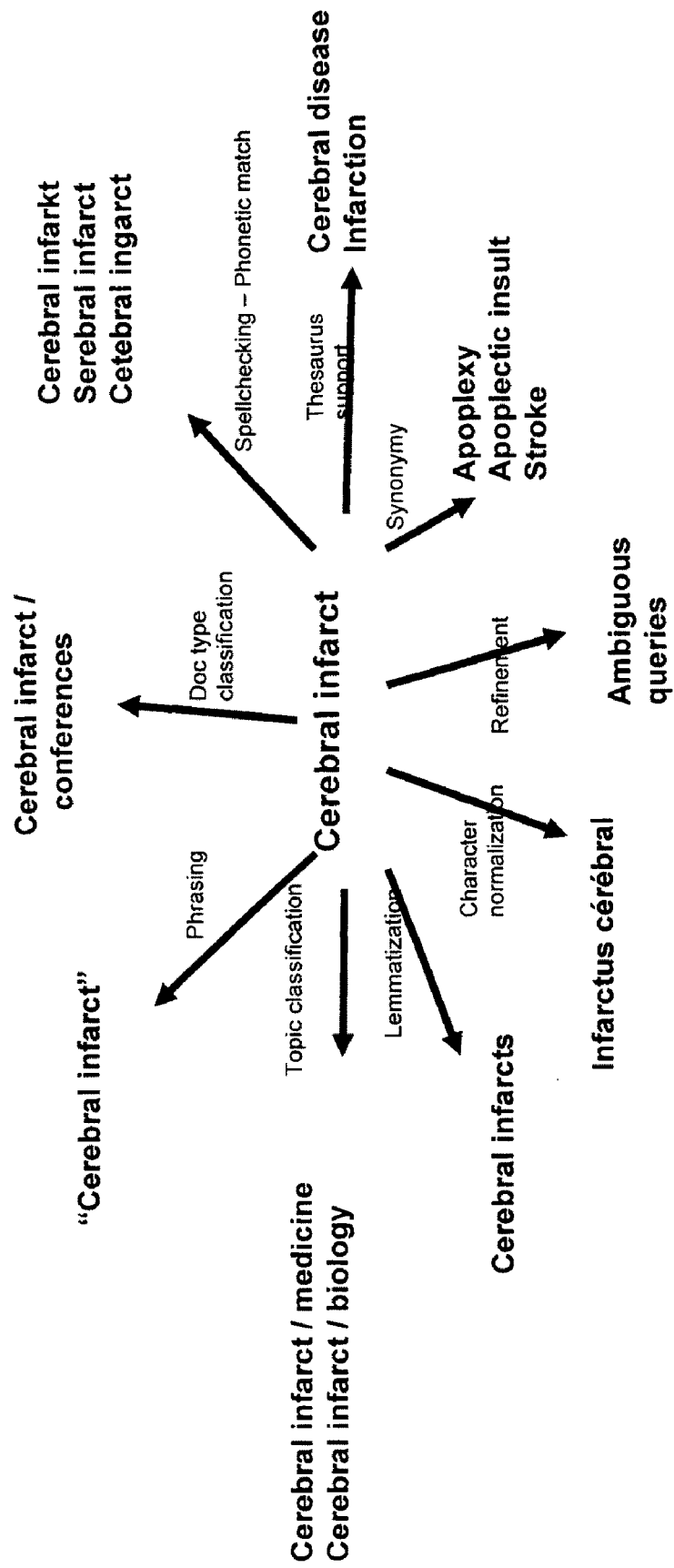

The present invention will be discussed in more detail in the following detailed disclosure of exemplary embodiments of the present invention and read in conjunction with the appended drawing figures better understood, of which FIG. 1 shows a block diagram for an example search engine architecture, FIG. 2 prior art approaches for associating global document level categories, concepts, entities and facts with a document and using this for navigation and analysis purposes, FIG. 3 how global document level attributes can be summarized across a result set in various ways, FIG. 4 how structured data and global attributes of unstructured data can be combined to create a numerical representation suitable for analytical tasks, FIG. 5 how contextual association between query and document properties can remove irrelevant associations between query and detected properties, FIG. 6 an example input text containing textual data and visual formatting elements, FIG. 7 how the example text in FIG. 6 can be automatically decomposed into semantic subsections, FIG. 8 a typical taxonomy structure and an example system for managing taxonomy properties, FIG. 9 part of speech tagging that finds the most likely grammatical representations for the input text, FIG. 10 how the example text in FIG. 6 can be automatically analyzed to identify both global properties such as a category and properties that are localized inside the document context, FIG. 11 a semantic decomposition of text into a paragraph containing multiple sentences with localized properties inside sentences, FIG. 12 an example of how input text can be analyzed with grammatical means to detect key patterns, semantic segments and entities inside the text, FIG. 13 how a query can be analyzed and normalized with linguistic techniques in order to improve the subsequent recall and/or precision of a search with normalized terms, FIG. 14 both a semantic decomposition of text with document properties embedded in the semantic structure and an approach for converting natural language queries into structured queries that utilizes the semantic document structure and associated properties, FIG. 15 an example text formatted as XML, FIG. 16 how summary information across result sets can be used to enable navigation experiences, FIG. 17 how contextual summary computation improves the precision and factual level of extracted document properties, FIG. 18 in the same way as FIG. 17 how contextual summary computation improves the precision and factual level of extracted document properties, FIG. 19 the difference between static facts or relationships modeled at index time and dynamic facts or relationships where user concepts are factually related to document properties in a contextual way at query time, FIG. 20 how a structured query can be specified in order to perform contextual summary information computation and display of supporting facts from the searched documents, FIG. 21 the same as FIG. 20 with a different example, FIG. 22 the same as FIG. 20 with a different example, FIG. 23 how query disambiguation can be performed by relating the user query to pre-modeled document properties, FIG. 24 a potential way of semantically structuring input text and associating document ranges for the various document properties or semantic structures, and FIG. 25 some examples of rewriting rules for queries that enable targeted computation of contextual summary information.

DETAILED DESCRIPTION OF THE INVENTION

Generally the present invention relates to means and actions for computing contextual summary information across documents in search results. The present invention teaches various ways to associate document properties with localized structures within the document. The present invention also teaches how the query can be used to select localized structures within the document. To this end a method is disclosed for computing relationships between localized document properties and user queries. This capability is applied to computing contextual summary information where localized document properties are profiled across the result set in a contextual manner. The computed contextual summary information contains valuable insight for a multitude of analytical processes and associated visualization schemes.

An embodiment of the present invention relates to computing summary information across a result in a contextual manner in order to assure strong association between query intent and targeted document properties. Another embodiment teaches how improved navigation systems can be built based on contextual summary information. Another embodiment uses query rewriting and contextual summary information to improve how natural language queries can be handled. Another embodiment uses specific analysis to determine which document properties that are targeted by the query and combines this with contextual summary computation to create an improved information basis for answering queries. Another embodiment teaches how the constructed contextual summary information can be used to disambiguate queries.

FIG. 1 shows typical key components in a search engine. 101 illustrates content repositories where content can either actively be pushed into the search engine or via a data connector be pulled into the search engine. Typical repositories include databases, sources made available via ETL tools such as Informatica, any XML formatted repository, files from file serves, files from web servers, document management systems, content management systems, email systems, communication systems, collaboration systems, and rich media such as audio, images and video. The documents are submitted to the search engine via content API 102. Subsequently, documents are analyzed in a content analysis stage 103 in order to prepare the content for improved search and discovery operations. Typically, the output of this stage is a XML representation of the input document. The output of the content analysis is used to feed the core search engine 104. The core search engine can typically be deployed across a farm of servers in a distributed manner in order to allow for large sets of documents and high query loads to be processed. The core search engine can accept user requests and produce lists of matching documents. The document ordering is usually determined according to a relevance model that measures the likely importance of a given document relative to the query. In addition, the core search engine can produce additional meta data about the result set such as summary information for document attributes. Alternatively, the output of the content analysis stage can be fed into alert engines 105. The alert engine will have stored a set of queries and can determine which queries that would have accepted the given document input. A search engine can be accessed from many different clients or applications. 109 and 110 illustrates mobile and computer based client applications. These clients will submit requests to the search engine query API 108. The search engine will typically have means to analyze and refine the query 106 in order to construct a derived query that can extract more meaningful information. Finally, the output from the core search engine 104 is typically further analyzed in order to produce information or visualizations that are used by the clients 109 and 110.

FIG. 2 illustrates how prior art systems have been designed to compute summary information for attributes that are globally associated with the documents. 201 illustrates a sample input document. Content analysis 103 of the input document can be used to derive many global attributes associated with the input document. FIG. 2 gives some examples such as the assigned category in a taxonomy 202, identified concepts 203, identified entities such as persons and universities 204, and static facts or relationships that are discovered at index time such as a given person working at a given university 206. The global document properties are subsequently associated with the document ID 207 and this information is used for a large set of applications including analysis, navigation and visualization 208.

Figure 3:
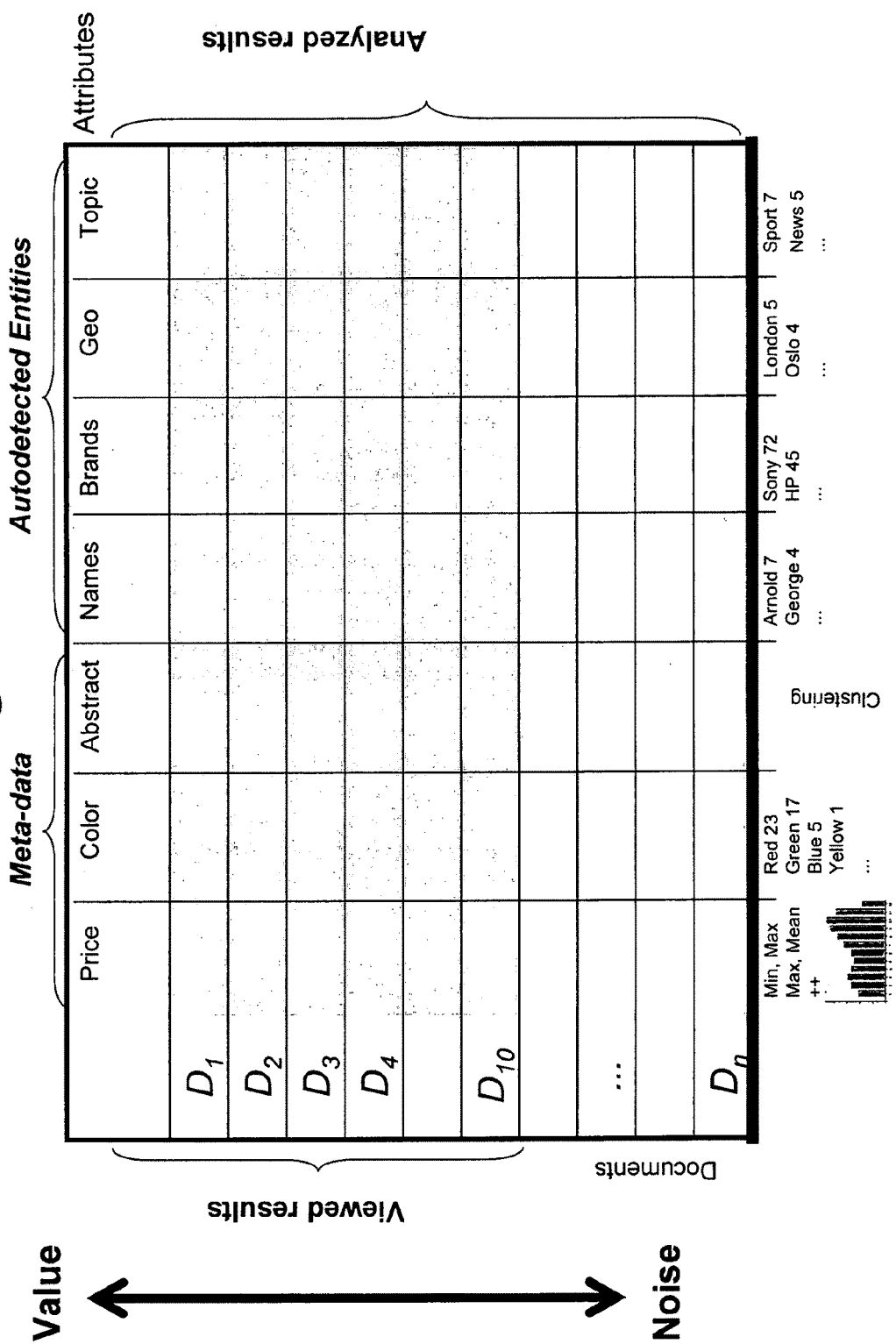

FIG. 3 illustrates how prior art systems compute document summary information for global document properties. The query is first evaluated and returning a set of N matching documents. The relevance model is then used to rank the documents from most valuable to least valuable relative to the query $(D_1 > D_2 > \ldots D_N)$. Typically, a given number of the highest ranking documents are returned to the client and used to construct a result page. The attributes associated with the documents can be both meta-data from the original content repository or meta-data that has been discovered inside the content analysis 103. The summary information is either computed based on a certain number of the highest ranking documents or on all N documents that satisfy the query. FIGS. 2,3 and 4 illustrates some examples of summary information such as frequency, histograms, and statistical parameters.

Figure 4:
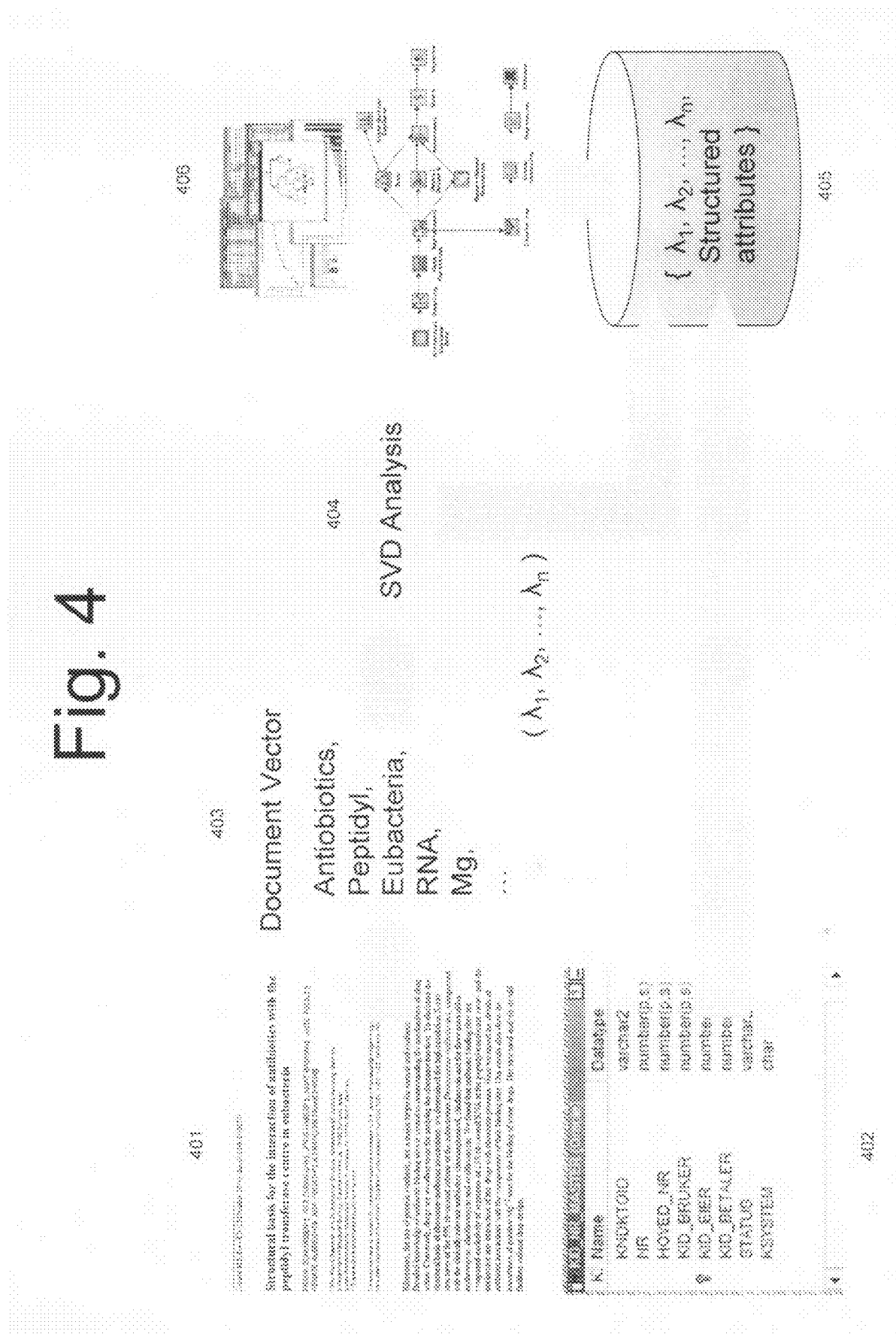

FIG. 4 illustrates a typical prior art scenario for how business intelligence applications combine structured data and extracted properties from text for analysis and classification purposes. The input text 401 is analyzed to create a document vector 403 where the key terms and concepts in the document are assigned weights and treated as dimensions in a multidimensional representation of the text. Singular value decomposition or principal component analysis 404 is often used to reduce the model complexity and get orthogonal information for the subsequent analysis. The text can in this way be converted to a purely structured representation 405 that can be combined with any structured meta data 402 and create a basis for traditional classification, predictive modeling or analytical processes in general.

Figure 5:
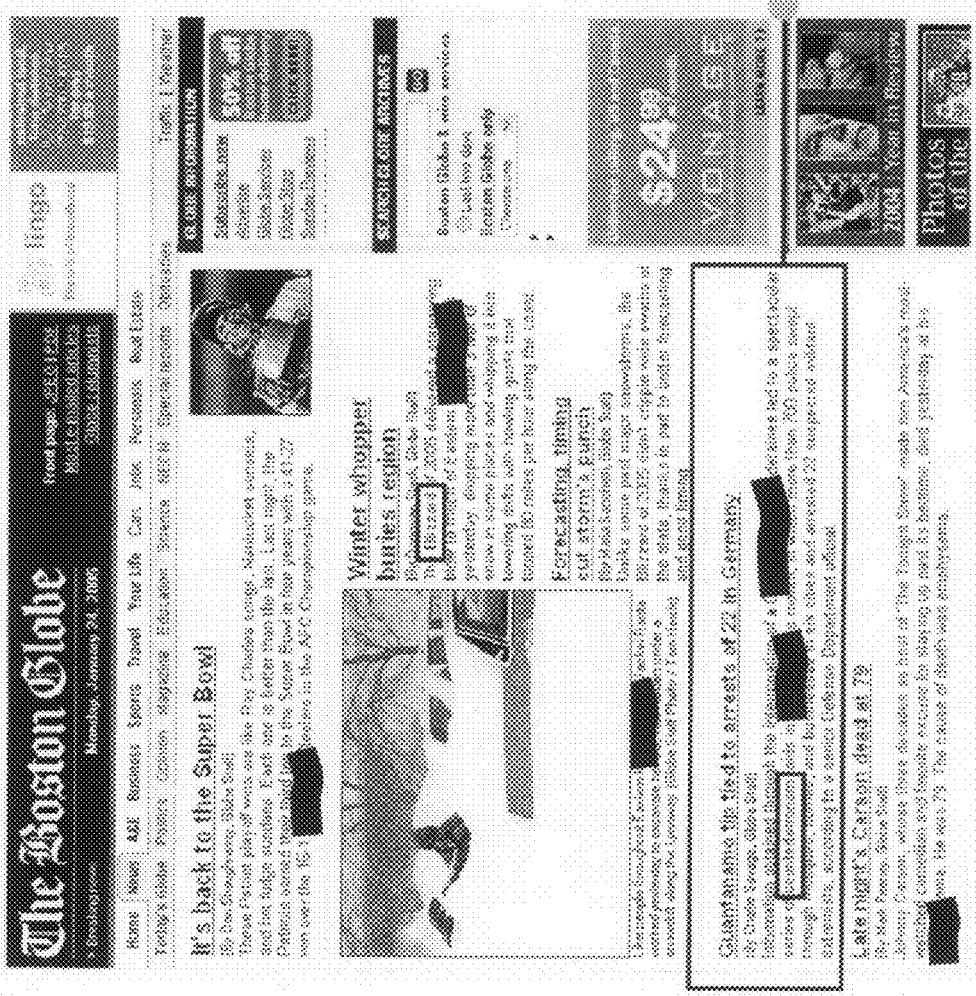

FIG. 5 illustrates key problems associated with prior art summary computation on a global document level. The first example shows how the query "blizzard" is linked to a lot of geographical locations including "Canada", "Western Europe", "Massachusetts", "Pittsburgh", "Germany", "Guantanemo Bay", and "Malibu". "Massachusetts" is factually related to the "blizzard" query term, but all the other are just accidentally appearing in the same document as the query "blizzard". The prior art methods for computing summary information explained in FIG. 2 and FIG. 3 will include all of the erroneous geographical summary information and all subsequent usages of the summary information will be impacted by this high noise component. One example of this is navigation experiences where the user identifies desired property values from a visualization of the summary information. FIG. 5 also illustrates a contextual way taught in this invention to associate queries with factually related document properties. The query "counterterrorism" selects a semantic document subsection. Similarly, the document properties such as geographic entities can be associated with a location or a range inside the document. Hence, in this example only "Guantanamo Bay" and "Germany" are extracted as document properties that are contextually related to the query. The contextual relationship analysis between the query and document properties reduces the noise factor of erroneous associations dramatically and the quality of the derived contextual summary information will be increased accordingly. All subsequent analysis or visualization steps based on summary information will enjoy a corresponding precision improvement.

The content being analyzed can as described for FIG. 1 come from many sources including databases, sources made available via ETL tools such as Informatica, any XML formatted repository, files from file serves, files from web servers, document management systems, content management systems, email systems, communication systems, collaboration systems, and rich media such as audio, images and video. Many of these data sources can be further improved for efficient computation of summary information by doing target content analysis 103. FIG. 6 illustrates an example input of an article that contain implicit, visual structure such as titles, affiliations etc. Inside the content analysis stage 103 automated means can be deployed to recognize semantic structures by using rules responsive to vocabulary, grammatical patterns, formatting and visual layout. FIG. 7 illustrates how the input text from FIG. 6 has been analyzed and the text decomposed into semantic blocks of information such as title section 701, author section 702, affiliation section 703, and the abstract 704. FIG. 8 illustrates an example of a global attribute where a category from the taxonomy is assigned to the document. 801 illustrates an example of the hierarchical taxonomy and the figure indicates a typical user front end for how such taxonomies can be managed, updated and trained.

FIG. 9 illustrates how textual content can be analyzed with part-of-speech analysis to determine both possible and the most likely grammatical interpretation of the terms in the document. The output of such analysis can be used to identify general purpose document properties such as Noun-Noun expressions. Further analysis can turn generic grammatical interpretations around to specific terms, concepts or expression patterns that can encode highly targeted document attributes in a contextual way. FIG. 10 illustrates how a global attribute like the "medical" category assignment is associated with the input document. Furthermore, three example entities are identified within the context of the original document. FIG. 10 illustrates how author names 1002, research institutes 1003, and science concepts 1004 have been identified within the original input document.

FIG. 7 illustrated how the input text can be decomposed into semantic structures that are application specific. FIG. 11 illustrates how generic semantic concepts like titles, chapters, visual blocks, paragraphs, sentences, and entity information can be automatically identified. FIG. 11 illustrates paragraph decomposition 1101 of a document with multiple sentence segments 1103 inside the paragraph and various entities 1104 located inside the sentence structures. The semantic decomposition can use simple elements as identification of tokens such as sentence breaks and paragraphs breaks in addition to various technologies available for recognizing entities. More elaborate patterns encoded in grammars can also be matched with the text and the matching relationships between the text and nodes in the grammar can be used to create a contextual decomposition of the document. FIG. 12 gives an example of this where a simple grammar 1202 has been used to analyze an input text 1201 and identify key text segments 1203 matching the grammar structure.

Contextual summary information requires a contextual matching of query concept occurrences and locality of document properties. High quality extractions will hence require that the query is appropriately normalized in order to do robust identification of corresponding terms and concepts within the document. FIG. 13 illustrates how various linguistic techniques in a concrete example can be utilized to rewrite, normalize or expand the user query. This analysis will typically occur inside the query analysis module 106 and produce a modified query that is subsequently sent to the core search engine 104.

FIG. 14 illustrates how document- and query analysis can be performed to enable contextual summary information in general. The figure also illustrates how processing of natural language queries can be improved by access to contextual summary information. An input document 1402 is decomposed into paragraphs 1410 which are further decomposed into sentences 1408. Inside the sentences, ranges are marked up as document properties with specific values 1406 and 1407. The document properties can be recorded in both a full/original form and an associated base form. FIG. 14 illustrates two examples of this. 1409 shows an example where a date is both recorded in the original form (March 2002) and a normalized base form (2002-03-XX). The normalized base form simplifies profiling, range searching and robust generation of summary information. Examples of document properties that can be recognized in a similar way include person names, company names, locations, acronyms, dates; filenames, URLs, phone numbers, zip codes, email addresses, universities, newspapers, price information, product information, numerical attributes, and stock tickers. The document properties can either be associated with a given location in the document, an interval or a range in the document or a structure in a XML representation of the document.

FIG. 14 illustrates in 1401 how a natural language query can be rewritten to leverage contextual summary information for improved precision. The input query example "When has Ukraine had elections?" is decomposed into key concepts such as "Ukraine" and "elections". The "When"-clause in the query also indicates that the user is looking for a date, hence the query can be rewritten to a structured query where factual relationships between the concepts "Ukraine" and "election(s)" and at the same time a date referral. One example evaluation can hence be to extract all sentences that include "Ukraine", either election or elections, and a date entity recognized within the same sentence. Across all of these sentences summary information will be constructed for the unknown date property. Finally, the possible values of dates co-occurring with "Ukraine" and "election(s)" in a factual way will be produced from the summary information. This output can be used to identify clear candidate(s) and present this or these to the end user as a potential answer. In this way question answering systems can be efficiently built by utilizing the contextual summary information. Alternatively, the range of possible date values can be presented visually to the end user and hence enabling a contextual navigation experience where the user can select the factually related date value(s) that should be focused.

The contextual summary information requires an identification of document subsections of particular relevance for the query. One way this can be computed is based on proximity analysis in the document. The locations of the terms in the document matching one or more query terms/concepts are first identified. The match can either be identical, linguistically normalized, synonyms or empirically derived term correlations. The proximity analysis can select subsections that have a certain offset distance from these document locations. The semantic structure of the document can also be used to make sure that semantic structures like sentences or paragraphs are preserved in the computation of relevant document subsection. The analysis can also associate weights with various document locations and hence document properties associated with these locations can be weighted in order to improve the subsequent computation of contextual summary information. A second way to compute document subsections is to divide the documents up into a set of subsections at index time. Typically, this can be done by either selecting equal size subsections or aligning the subsections to semantic structures such as document paragraphs. Since document themes can carry across different sentences/paragraphs it is also often beneficial to allow the pre-computed document subsections to be overlapping in a sliding window manner.

XPath and XQuery are examples of structured query languages that can be used to select document subsections explicitly and hence also select document properties related to these subsections. In general, computation of contextual summary information requires a query dependent selection of document subsections $D \rightarrow q(D)$. Note that $q(D)$ can consist of many non-continuous document sections such as sentences selected across a large document. D denotes a matching document and $q(D)$ is the selected subsection of D. For all tokens and attributes associated with the document only tokens and attributes belonging to $q(D)$ will be used for computing contextual summary information. Let p be a document property inside the query dependent document subsection: $p \in q(D)$. The membership calculation $p \in q(D)$ can be based on first also associating document subsections with document properties. We can hence think of a document as having a set of document properties $\{p_i\}$ where each property will have an associated document subsection $p_i(D)$. Note that different instances of a document property such as a location entity must be treated separately in this framework because they typically have different local associations in the document. The membership test $p \in q(D)$ can hence be performed as $p \in q(D)$ if and only if $q(D)$ intersects $p_i(D)$. Both $q(D)$ and $p_i(D)$ can have associated weights that make it possible to replace the binary membership test $p \in q(D)$ with a weight $w(p_i)$ responsive to $q(D)$ and $p_i(D)$. The weight $w(p_i)$ can for instance be used as a replacement for the binary selection in the computation of contextual summary information to improve the sensitivity and gradation of factual relationships.

FIG. 3 can be used to illustrate computation of contextual summary information as well. Let $D_i$ denote the matching documents and $p_{rs}$ represent the s'th occurrence of the r'th document property. The values included in computation of contextual summary information for document property $p_r$ will in this case be limited to instances such that $p_{rs}(D)$ and $q(D)$ intersects. In addition, as previously explained, weights can be computed to quantify the relevance of the selected document properties. As for non-contextual summary information, the aggregation can be done across the complete result set, across a certain set of the highest ranking documents or across a certain set of the highest ranking document subsections.

The contextual summary information can include statistical information for numerical attributes. Examples of this include maximum values, minimum values, average values, variance, order statistics, distribution parameters and histograms. Frequency computations can be applied to all attributes with discrete values. The frequency summary information can also be computed for hierarchical structures such as taxonomies in a way such that parent nodes show the total occurrence number for all child categories. The resulting taxonomy counts can be used to limit visual display of the taxonomy to categories that actually have relevant results and expose the taxonomy at the appropriate granularity level. Both supervised and unsupervised clustering can be applied to numerical and textual properties in order to generate contextual summary information. An example of this is document properties that are multi-dimensional vectors such as a longitude, latitude location vector. An ontology can also be used as a basis for computing contextual summary information. An ontology will have a representation such as a graph structures where concepts are related. By identifying properties to this representation and performing analysis across the ontology representation key concepts can be better understood and related based on supporting information in the result set.

FIG. 15 illustrates a typical XML input. The document is represented in a hierarchical manner and textual as well as any other type of attributes can be encoded at an arbitrary level. XPath and XQuery are examples of structured query languages that can be used to identify documents and sub-document structures with specific properties. In this example it is for instance possible to look for speeches where the speaker is Cleopatra and there is a line mentioning Caesar. The XML structure illustrated in FIG. 15 can either be the structure of the input document or a structure that is computed and encoded in the content analysis steps 103 for content of any type.

A key embodiment for the present invention is to improve the precision of summary information across result sets by restricting the analysis to document properties that are factually related to the query. This improved summary information can be used to empower navigation experiences with higher quality properties and property values available for content discovery and result set navigation. FIG. 16 illustrates how a name search 1601 in addition to the search results 1602 uses summary information to navigate and explore the result set. 1603 shows related names, 1604 shows geographical locations associated with the names, 1605 shows potential interpretations of the first name, and finally 1606 shows potential interpretations of the surname. In a highly organized database this type of summary information can be compute based on global document attributes. Contextual summary information enables a similar experience even for names, addresses and telephone numbers "hidden" inside larger textual documents.

Navigation experiences utilizing contextual summary information can either be deployed reusing concepts for non-contextual summary information or explicitly leveraging the increased factual relationships to document property values. Configuration engines can be built to control the visual experience by configuring rules responsive to user profiles, user locations, date/time, user session characteristics, site navigation history and most importantly query properties. In addition, automated means can compute which document properties that contain key information for the set of matching documents. Each of these document properties can be further analyzed to determine which properties that have the potential largest information gain by allowing the user limit the set of allowed values. The entropy of the frequency distribution is one example of a mathematical measurement that would support this analysis. A color-property with 999 red examples and 1 blue example would for instance provide little added value as a navigation option for the end user. By combining these elements effective navigation experiences can be built that in a dynamic, query dependent way highlights key properties across the result set based on contextual summary information and enables the user to further discover or narrow down the result set.

Figure 17:
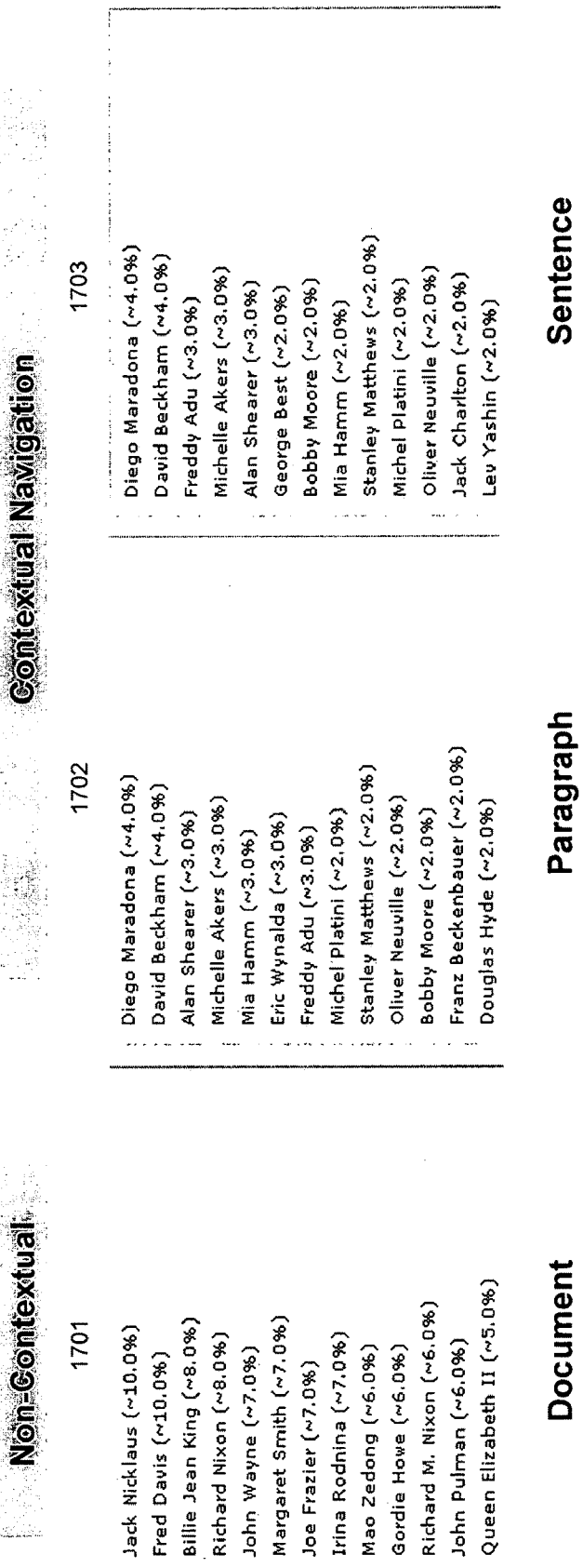

FIG. 17 illustrates the significantly improved precision that is obtained by computing summary information in a contextual manner. In this example 400.000 documents from an encyclopedia have been used as the document set. The query "soccer" is used in 1701 to select documents and perform non-contextual summary information for person names identified in the matching documents. Most of these names are just popular names that are frequently mentioned in the document set and they co-occur inside larger documents that also mention "soccer". There are on the other hand no factual relationships between the "soccer" query and most of these persons. 1702 and 1703 illustrate the improved precision when the contextual analysis is restricted to a paragraph level and a sentence level. In the sentence level menu all person names have a strong factual relationship to the query term "soccer" and can be recognized as well known soccer players.

FIG. 18 illustrates the same point as FIG. 17 for a different query. Non-contextual summary information 1801 produces many names that are not factually related to the query. Contextual summary information 1802, 1803 produces names that are strongly related to the query.

FIG. 19 illustrates how contextual summary information is creating dynamic facts or relationships at query time. Dynamic facts represent a very powerful mechanism in a range of information retrieval problems and significantly reduce the necessary management associated with static facts. Static facts are typically modeled and identified in the input documents at index time inside the content analysis stages 103. FIG. 19 has an example where the "Moon" relationship is modeled and used to identify a relationship between the planet Saturn and Titan which is a moon of Saturn. A query for Titan can hence use such facts to retrieve or analyze information about related concepts and entities. The static fact approach requires a highly granular content modeling and just maintenance will in many cases be prohibitive. Alternatively, document properties can be identified at a less granular level and encoded contextually inside the document. In this example the up front modeling has been restricted to planets and "Saturn" 1901 is accordingly identified inside the input text. The user is in this case searching for "Titan" that has not been modeled in the structuring of the document repository, but contextual and factual relationships between a user concept (Titan) and a content concept (Saturn) is detected at query time. Hence, similar capabilities as static facts can be obtained based on contextual summary information, but with the advantage of significantly less up front modeling and the ability to understand completely new concepts introduced by the user via the search query.

Figure 20:
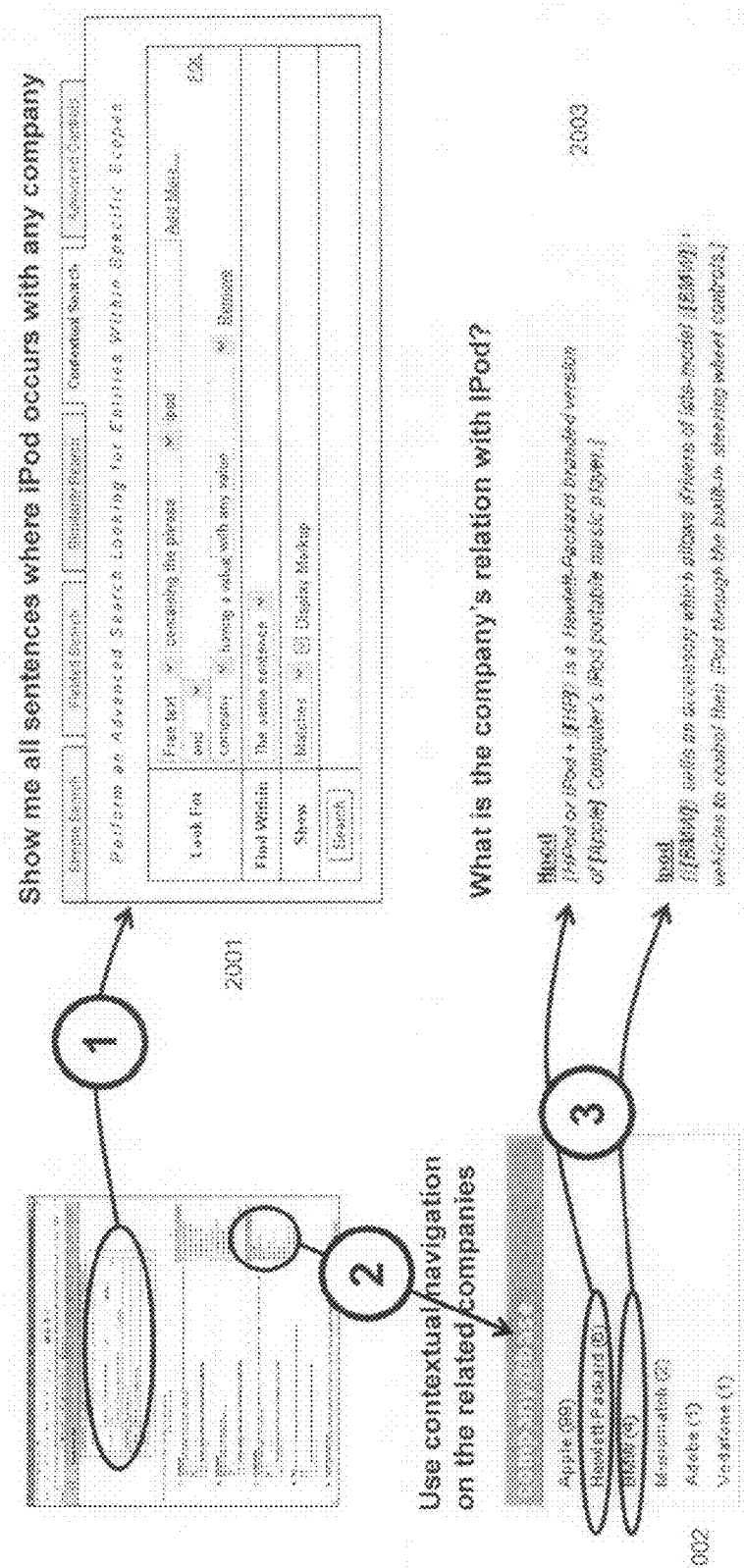
Figure 21:
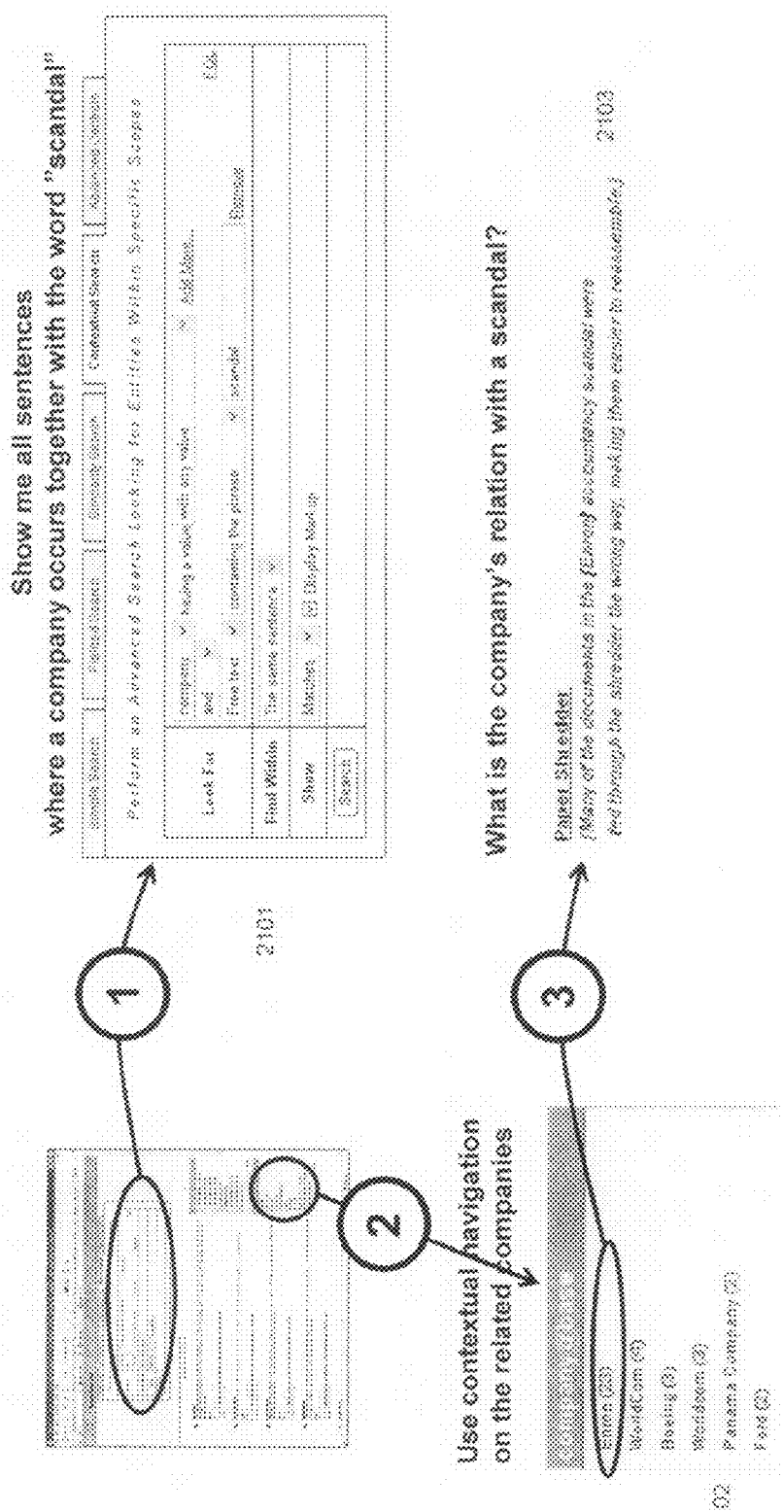
Figure 22:
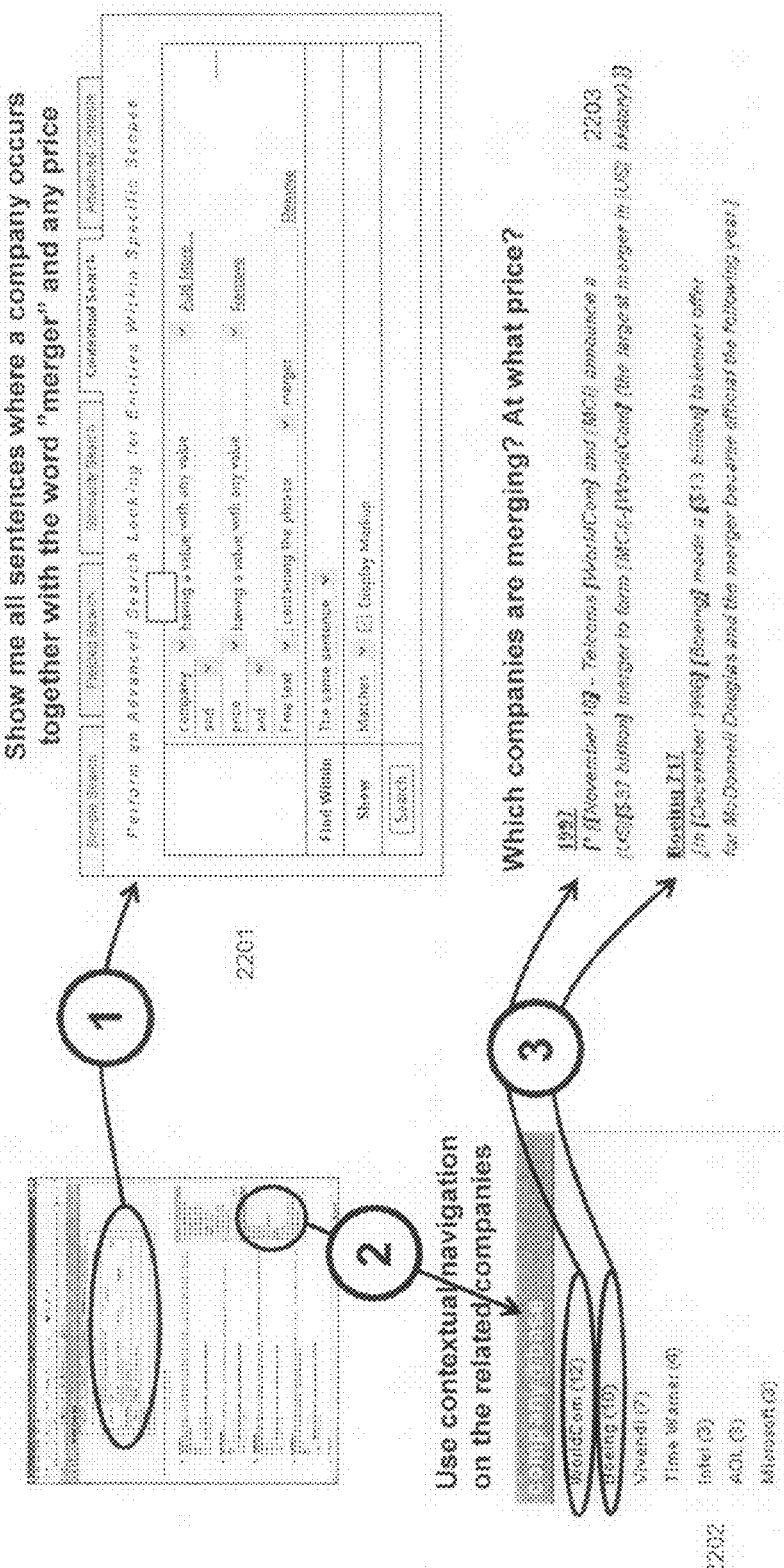

FIGS. 20, 21 and 22 illustrate three examples of how contextual summary information can be computed and used to create both high precision navigation experiences and links back to the actual facts inside documents that support the contextual summary information. In FIG. 20 a query is constructed to identify sentences containing both the term "iPod" and a recognized company entity 2001. The contextual summary information is used to create a navigation menu showing the frequency of how often various companies are factually related to the iPod product 2002. In addition, for each of the companies the set of supporting facts can be extracted. In this case, BMW is for instance included because a dynamic fact has been discovered stating that "BMW sells an accessory which allows drivers of late-model BMW vehicles to control their iPod through the built-in steering wheel controls". Similarly, FIG. 21 illustrates a query constructed to identify sentences containing both the term "scandal" and a recognized company entity 2101. The contextual summary information is used to create a navigation menu showing the frequency of how often various companies are factually related to "scandal" 2102. In addition, for each of the companies the set of supporting facts can be extracted. In this case, Enron is for instance included because a dynamic fact has been discovered stating that "Many of the documents in the Enron accountancy scandal were fed through the shredder the wrong way, making them easier to reassemble". Finally, FIG. 22 illustrates a slightly more complex example with a query constructed to identify sentences containing the term "merger", a recognized company entity, and the mention of a price attribute 2201. The contextual summary information is used to create a navigation menu showing the frequency of how often various companies are factually related to the mergers quantified with a price 2202. In addition, for each of the companies the set of supporting facts can be extracted. In this case, Boeing is for instance included because a dynamic fact has been discovered stating that "In December 1999 Boeing made a $13 billion takeover offer for McDonnell Douglas and the merger became official the following year".

One embodiment of the present invention is query disambiguation. FIG. 23 illustrates an example where contextual summary information is used to understand the intent behind the query and disambiguate the query if there are multiple possible intent interpretations. The example is from mobile search where a user has searched for "toxic" 2301. A straight forward search engine analysis might determine that the Greenpeace home page is the best search result since it mentions toxic and is in general a well regarded site. FIG. 23 illustrates how the search engine can use a structured query to discover factual relationships between the user query and concepts that have been modeled inside the document repository. 2302 illustrates an automated query that identifies which types of document properties that are factually related to the user query. The contextual summary information will in this case identify what type of pre-modeled document properties that empirically discovered are factually related to the query. As an example from mobile search this might produce an entity called music artists. Already the intent of the query has been discovered. If multiple intents are present more than one document property might show up as candidates in this analysis. Secondly, a query is executed to determine the most frequent values factually related to the query term for the auto-discovered music artist entity 2304. The example indicates "Britney Spears" since "toxic" happens to be a title for one of her songs 2305. The two automated queries behind the scenes have in this way established a relationship between an unknown user query and key concepts modeled in the content. With more than one interpretation of the intent multiple properties and/or multiple dominant property values would have been discovered. Knowing that the query is factually related to the music artist "Britney Spears"—very specific options can be provided to the user as a search result. FIG. 23 illustrates two examples where download actions for the specific ring tone or discovery of Britney Spears related content is offered 2306.

FIG. 24 illustrates how an input text 2401 can be represented as a XML structure 2403 where semantic structures and document properties are encoded such that they can be correlated to the query in a contextual manner. The figure illustrates one example where offset ranges are used to annotate both semantic structures and document properties.

FIG. 25 illustrates some examples of query rewriting rules where pattern classes of queries are identified and rewritten to structured queries that identify semantic components inside the documents with properties deduced from the query representation. Question-Answering can be implemented by combining such query rewriting with contextual summary information taught in this invention. In this example, "when" and "where" queries are remapped to compute contextual summary information for dates and locations. The associations are made within factual relationships inside the documents and maintaining the other key concepts or intents implied by the query.

Prior art describes ways to detect relationships between entities by analyzing textual input. The present invention pursues a different and more sophisticated approach by detecting of relationships between query concepts and factually related document properties at query time. The method and means of the present invention provide dynamics or query time analysis which will significantly enhance the capability of discovering factual relationships and at the same time reduce the need for extensive a priori modelling and analysis of data.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for determining contextual summary information across documents in a search result, comprising steps for:
   identifying a result set by applying a query to a set of documents, the result set comprising a plurality of matching documents, the query comprising a query term, each of the matching documents including the query term;
   performing the following actions for utilized matching documents in the result set:
      identifying locations of a document term in the utilized matching documents, the document term being a match to the query term; and
      selecting subsections of the utilized matching documents that have a certain offset distance from the locations of the document term;
      identifying ones of the selected subsections that contains a value of a document property; and
      computing, by a computer, summary information, the summary information indicating frequencies at which different values of the document property occur within the identified ones of the selected subsections of the utilized matching documents in the result set.

2. The method of claim 1, wherein semantic structures of the matching documents are preserved in selecting the subsections of the matching documents that have the certain offset distances from the locations of the document term.

3. The method of claim 1, further comprising matching linguistic normalized forms, synonyms or empirically derived term correlations to obtain the match between the document term and the query term.

4. The method of claim 1, wherein each of the said matching documents is represented as a hierarchical structure encoding attribute/value pairs.

5. The method of claim 4, wherein the hierarchical structures of the matching documents are encoded using XML.

6. The method of claim 5, wherein the query is specified in either an XPath query language or an XQuery query language.

7. The method of claim 1, further comprising: performing an index time analysis of the set of documents to discover and encode semantic structures of each document in the set of documents.

8. The method of claim 7, wherein the semantic structures of the documents in the set of documents include at least one of: titles, chapters, visual blocks, paragraphs, sentences, and entity information.

9. The method of claim 1, further comprising: for each document in the set of documents, establishing associations between document subsections of the document and document properties of the document when the document subsections of the document include positions in the document indicated by ranges that annotate each of the document properties of the document.

10. The method of claim 9, wherein each of the ranges indicates a point location in the document, an interval location in the document, and an XML substructure in the document.

11. The method of claim 1, further comprising: for each document in the set of documents, including recognized-entity properties in the document, the recognized-entity properties including at least one of: person names, company names, locations, acronyms, dates, filenames, URLs, phone numbers, zip codes, email addresses, universities, newspapers, price information, product information, numerical attributes, and stock tickers.

12. The method of claim 11, wherein the summary information includes computation frequency information for the existing recognized-entity properties.

13. The method of claim 1, using a part of speech analysis of the set of documents to identify document properties of documents in the set of documents.

14. The method of claim 1, wherein both an original form and a normalized base form of the document property are used to compute the summary information.

15. The method of claim 1, wherein the utilized matching documents include all matching documents in the result set.

16. The method of claim 1, wherein the utilized matching documents only include a given number of the matching documents with the highest relevance scores in the result set.

17. The method of claim 1, wherein the summary information only indicates frequencies at which the values of the document property occur within a given number of the identified ones of the selected subsections of the utilized matching documents with the highest relevance scores in the result set.

18. The method of claim 1, wherein the summary information includes statistical properties for numerical attributes.

19. The method of claim 18, wherein the statistical properties include at least one of: maximum value, minimum value, average value, variance, order statistics, distribution parameters, and histograms.

20. The method of claim 1, wherein computing the summary information comprises:
   organizing values of document properties into a hierarchy; and
   computing frequencies for each value of the document properties, wherein the frequencies for child nodes in the hierarchy are aggregated into the frequency counts for parent nodes in the hierarchy.

21. The method of claim 20, wherein the hierarchy represents a taxonomy structure.

22. The method of claim 1, wherein computing the summary information comprises applying clustering to selected document properties of the matching documents.

23. The method of claim 22, wherein the selected document properties of a given matching document in the result set include one or more textual subsections; and
   wherein applying clustering to the selected document properties of the given matching document comprises clustering individual terms in said one or more textual subsections.

24. The method of claim 1,
   wherein document properties for the matching documents include multi-dimensional attributes; and
   wherein the summary information is responsive to a distance measure defining similarity in an associated multi-dimensional space.

25. The method of claim 24, wherein the multi-dimensional attributes represent location.

26. The method of claim 1,
   wherein at least one document property of one of the matching documents indicates nodes in an ontology,
   wherein computing said summary information comprises performing an analysis of concepts by relating occurrences across the ontology.

27. The method of claim 1, further comprising: creating contextual navigation by allowing a user to select subsets of the matching documents and document subsections based on desired properties of the summary information.

28. The method of claim 27, further comprising: selecting which document properties are presented as navigation options by means of rules that are responsive to at least one of: user profile, location associated with query, time, user session, site navigation history, and query properties.

29. The method of claim 27, further comprising: selecting which document properties are presented as navigation options in response to an automated analysis measuring presence of contextual document properties and the potential information gain in limiting allowed values for a specific contextual document property.

30. The method of claim 1,
   wherein the query is a natural language query; and
   wherein the method further comprises: answering the natural language query by using an automatically modified query based on identifying document properties of interest implied by the natural language query, and identifying key concepts and terms in the natural language query.

31. The method of claim 30, further comprising using at least one of the following to identify document properties implied by the natural language query: mapping "who" queries to recognize <person> entities, mapping "where" queries to recognize <location> entities, and mapping "when" queries to recognize <date/time> entities.

32. The method of claim 1, further comprising:
   providing question-answering capabilities based on identifying a document property that might contain a direct answer implied by the query,
   selecting localized document subsections that assure factual relationships between document properties and query concepts, and
   computing summary information for the implied document property across the said document subsections assuring factual relationships.

33. The method of claim 32, using sentences as the localized document subsections.

34. The method of claim 32, identifying the localized document subsections by grammatical analysis where known patterns for targeted relationships are detected.

35. The method of claim 1, further comprising:
   performing query disambiguation based on identifying which document properties related to the query are within document subsections that assure factual relationships between query concepts and document properties,
   identifying dominant values for the identified document properties, and
   evaluating the query in a modified way responsive to the identified document properties and the associated dominant values.

36. The method of claim 35, further comprising presenting search results in response to the identified document properties and the associated dominant values.

\* \* \* \* \*